US011681721B2

(12) United States Patent
Chadha et al.

(10) Patent No.: US 11,681,721 B2
(45) Date of Patent: Jun. 20, 2023

(54) SYSTEMS AND METHODS FOR SPARK LINEAGE DATA CAPTURE

(71) Applicant: JPMORGAN CHASE BANK, N.A., New York, NY (US)

(72) Inventors: Shalu Chadha, New Delhi (IN); Ravi Kumar Sanjeevi, Rajahmundry (IN); Sarath Chandra Bhargav Jiguru, Hyderabad (IN); Madhu Kotagiri, Karimnagar (IN); Nikesh Bisen, Balaghat (IN); Ramana Chelkala, Hyderabad (IN); Rajesh Dadi, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/225,886

(22) Filed: Apr. 8, 2021

(65) Prior Publication Data

US 2021/0349910 A1 Nov. 11, 2021

(30) Foreign Application Priority Data

May 8, 2020 (IN) .............................. 202011019617

(51) Int. Cl.
*G06F 16/248* (2019.01)
*G06F 16/25* (2019.01)
*G06F 16/242* (2019.01)
*G06F 16/901* (2019.01)

(52) U.S. Cl.
CPC .......... *G06F 16/254* (2019.01); *G06F 16/248* (2019.01); *G06F 16/2423* (2019.01); *G06F 16/9024* (2019.01)

(58) Field of Classification Search
CPC .. G06F 16/254; G06F 16/2423; G06F 16/248; G06F 16/9024
USPC .......................................................... 707/602
See application file for complete search history.

(56) References Cited

U.S. PATENT DOCUMENTS

| | | | | |
|---|---|---|---|---|
| 2005/0262188 A1* | 11/2005 | Mamou | ................. | G06F 16/254 |
| | | | | 709/203 |
| 2011/0145383 A1* | 6/2011 | Bishop | .................. | H04L 41/069 |
| | | | | 709/223 |
| 2013/0278964 A1* | 10/2013 | Zeng | ..................... | G06F 3/1288 |
| | | | | 358/1.15 |
| 2014/0114907 A1* | 4/2014 | Kozina | ................. | G06F 16/219 |
| | | | | 707/602 |

(Continued)

*Primary Examiner* — Amy Ng
*Assistant Examiner* — Antonio J Caiado
(74) *Attorney, Agent, or Firm* — Greenberg Traurig LLP (57) ABSTRACT

Systems and methods for SPARK lineage data capture are disclosed. In one embodiment, in an information processing apparatus comprising at least one computer processor, a method for lineage data capture may include: (1) receiving, at a lineage engine and from a listener service, a decisive logical plan for a job; (2) extracting, using a plan parser, lineage data from the decisive logical plan; (3) producing, by a job lineage builder, job lineage data and job attribute data from the lineage data; (4) extracting, by the job lineage builder and from the job lineage data and the job attribute data, attribute information, transformation information, and estimate information for the job; and (5) storing, in a database, the attribute information, the transformation information, and the estimate information.

16 Claims, 3 Drawing Sheets

(56) References Cited

U.S. PATENT DOCUMENTS

| | | | |
|---|---|---|---|
| 2015/0161214 A1* | 6/2015 | Kali | G06F 16/24558 |
| | | | 707/758 |
| 2015/0347193 A1* | 12/2015 | Wolfson | G06F 9/5038 |
| | | | 718/103 |
| 2017/0154087 A1* | 6/2017 | McClure | G06Q 10/0633 |
| 2017/0351511 A1* | 12/2017 | Bar-Or | G06F 16/183 |
| 2018/0011695 A1* | 1/2018 | Raman | G06F 11/07 |
| 2018/0052897 A1* | 2/2018 | Namarvar | G06F 8/4452 |
| 2018/0052898 A1* | 2/2018 | Allan | G06F 3/0482 |
| 2018/0144067 A1* | 5/2018 | Chatelain | G06F 16/24573 |
| 2018/0157702 A1* | 6/2018 | Clemens | G06F 16/83 |
| 2019/0266171 A1* | 8/2019 | Tran | G06F 21/6218 |
| 2020/0026565 A1* | 1/2020 | Rajendran | G06F 9/45558 |
| 2020/0334277 A1* | 10/2020 | Doyle | G06F 16/289 |
| 2020/0356599 A1* | 11/2020 | Xia | G06F 16/2453 |
| 2022/0342884 A1* | 10/2022 | Kumar | G06F 16/9024 |

* cited by examiner

SYSTEMS AND METHODS FOR SPARK LINEAGE DATA CAPTURE

RELATED APPLICATIONS

This application claims priority to, and the benefit of India Patent Application No. 202011019617, filed May 8, 2020, the disclosure of which is hereby incorporated, by reference, in its entirety.

BACKGROUND OF THE INVENTION

1. Field of the Invention

Embodiments generally relate to systems and methods for SPARK lineage data capture.

2. Description of the Related Art

Data lineage is generally defined as a kind of data life cycle that includes the data's origins and where it moves over time. This term can also describe what happens to data as it goes through diverse processes. Data lineage can help with efforts to analyze how information is used and to track key bits of information that serve a particular purpose.

In the new era of data computation, the complete extract-transform-load process is transforming into fast and reliable in memory computation using APACHE SPARK on HADOOP. There are, however, no tools or technologies that can capture the complete data lineage for a SPARK job to fulfill audit, data regulatory reporting, and Enterprise Meta Data (MDM) requirements.

SUMMARY OF THE INVENTION

Systems and methods for SPARK lineage data capture are disclosed. In one embodiment, in an information processing apparatus comprising at least one computer processor, a method for lineage data capture may include: (1) receiving, at a lineage engine and from a listener service, a decisive logical plan for a job; (2) extracting, using a plan parser, lineage data from the decisive logical plan; (3) producing, by a job lineage builder, job lineage data and job attribute data from the lineage data; (4) extracting, by the job lineage builder and from the job lineage data and the job attribute data, attribute information, transformation information, and estimate information for the job; and (5) storing, in a database, the attribute information, the transformation information, and the estimate information.

In one embodiment, the method may further include: receiving, at an interface, a job query for data lineage for the job; identifying, by a lineage relationship engine, a base job for the job and identifying at least one dependency for the base job; executing, by the lineage relationship engine, a recursive search on the database until an origin and a destination for the base job are identified; and outputting, at the interface, the origin and the destination for the base job.

In one embodiment, the interface may include a web service, a command line interface, or a database interface.

In one embodiment, the method may further include: identifying, by an attribute traversing engine and in the database, associated attributes for the base job; and outputting, at the interface, the associated attributes for the base job.

In one embodiment, the associated attributes may include one or more of an attribute name, an attribute type, an attribute classification, and an attribute complexity.

In one embodiment, the decisive logical plan may be converted from a parsed or indecisive logical plan for the job by a query manager.

In one embodiment, the decisive logical plan may include a plurality of stages.

In one embodiment, each stage may include a direct acyclic graph.

According to another embodiment, a system for lineage data capture, may include a job lineage builder executed by a computer processor; a lineage engine executed by a computer processor and comprising a plan parser; and an attribute database. The lineage engine may be configured to receive a decisive logical plan for a job and from a listener service; the plan parser may be configured to extract lineage data from the decisive logical plan; the job lineage builder may be configured to produce job lineage data and job attribute data from the lineage data; the job lineage builder may be configured to extract attribute information, transformation information, and estimate information for the job from the job lineage data and the job attribute data; and the job lineage builder may be configured to store the attribute information, the transformation information, and the estimate information in the attribute database.

In one embodiment, the system may further include an interface and a lineage relationship engine. The interface may be configured to receive a job query for data lineage for the job; the lineage relationship engine is configured to identify a base job for the job and at least one dependency for the base job; the lineage relationship engine may be configured to execute a recursive search on the attribute database until an origin and a destination for the base job are identified; and the interface may be configured to output the origin and the destination for the base job.

In one embodiment, the interface may include a web service, a command line interface, or a database interface.

In one embodiment, the system may further include an attribute traversing engine that may be configured to identify an attribute traversing engine and in the attribute database, associated attributes for the base job; and the interface may be configured to output the associated attributes for the base job.

In one embodiment, the associated attributes may include one or more of an attribute name, an attribute type, an attribute classification, and an attribute complexity.

In one embodiment, the system may further include a query manager that may be configured to convert the decisive logical plan is converted from a parsed or indecisive logical plan for the job.

In one embodiment, the decisive logical plan may include a plurality of stages. Each stage may include a direct acyclic graph.

According to another embodiment, a non-transitory computer readable medium having stored thereon software instructions that, when executed by a processor, may cause the processor to perform the following: receive a decisive logical plan for a job and from a listener service; extract lineage data from the decisive logical plan; produce job lineage data and job attribute data from the lineage data; extract attribute information, transformation information, and estimate information for the job from the job lineage data and the job attribute data; and store the attribute information, the transformation information, and the estimate information in an attribute database.

In one embodiment, the transitory computer readable medium may further include software instructions that, when executed by a processor, cause the processor to: receive a job query for data lineage for the job from an interface; identify a base job for the job and at least one dependency for the base job; execute a recursive search on the attribute database until an origin and a destination for the base job are identified; and output the origin and the destination for the base job to the interface.

In one embodiment, the interface may include a web service, a command line interface, or a database interface.

In one embodiment, the transitory computer readable medium may further include software instructions that, when executed by a processor, cause the processor to output the associated attributes for the base job.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for SPARK lineage data capture.

Building the custom lineage solution by implementing the SPARK listener pre-defined classes to get the logical plan. This solution is automated, transparent and programming language agnostic solution to track data transformations at attribute level from origin to destination.

APACHE SPARK is a unified analytics engine for large-scale data processing. SPARK is well-adapted to execute extract-transform-load jobs on Hadoop for fast and scalable performances.

Although commercially available products are used in the description below, it should be recognized that these products are exemplary only and other products may be used as is necessary and/or desired.

Figure 1:
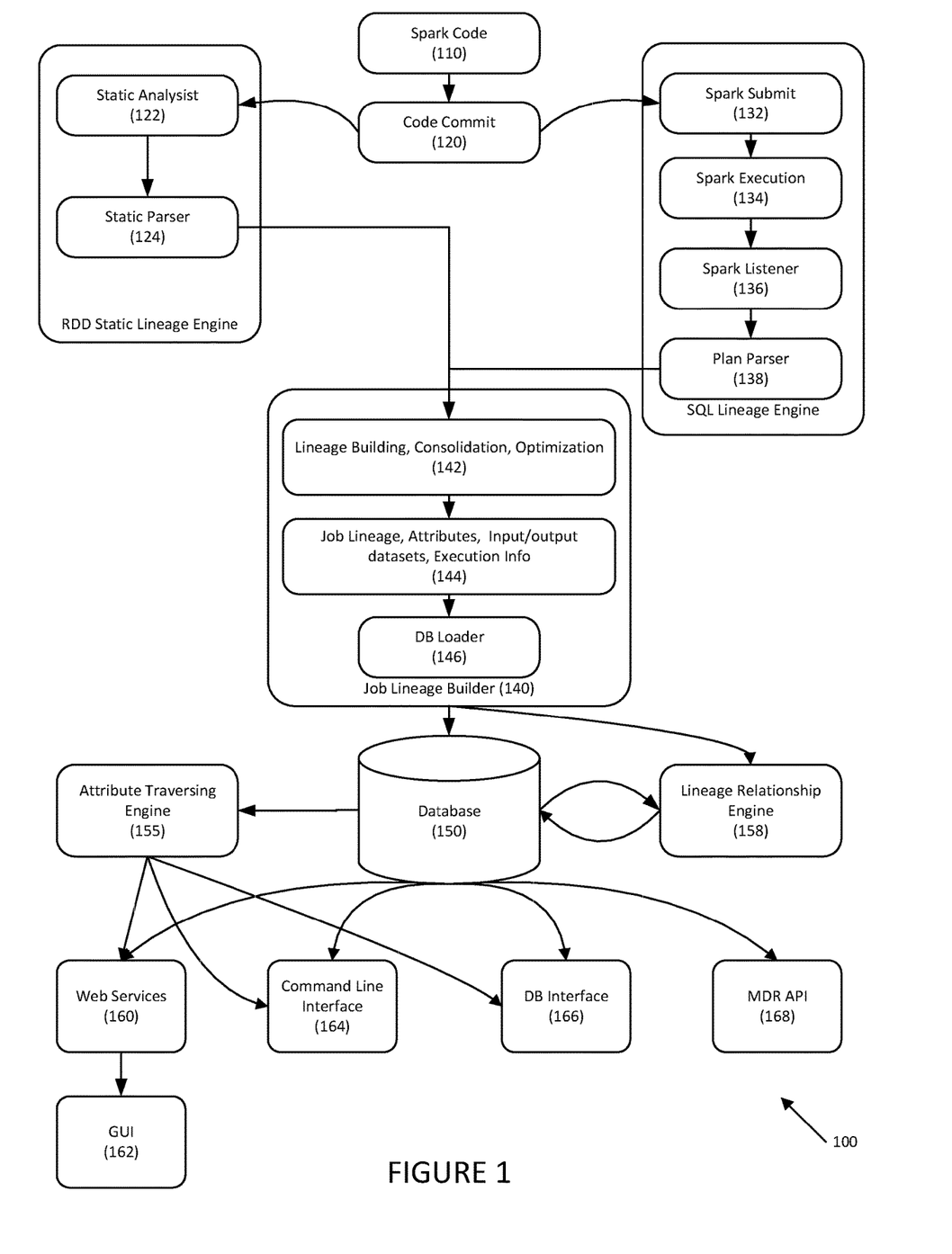
FIG. 1 depicts a system for SPARK lineage data capture according to one embodiment.

Referring to FIG. 1, a system for SPARK lineage data capture is illustrated according to an embodiment. System 100 may include SPARK code 110, which may be submitted to either the RDD static lineage engine via code commit 120. The RDD static lineage engine may include static analysist 122 and static parser 124, which may be encapsulated as one for each of the save/load actions. The RDD static lineage engine may organize the output by assigning a unique ID for each flow for a given job.

When SPARK code 110 is submitted using code commit 120, static analysist 122 may sequence the transformations as per the execution flow. Static parser 124 may capture RDD code blocks from SPARK code.

In one embodiment, static parser 124 may reads a debugged log created by the Spark job for any type of transformation in Java (RDD), Python (Data frames) or HQL. The parsing process collects the data in a readable JSON format. Build a generic code parser API's in Java and Python and store the results in a graph DB for building hierarchical and relations The output from the static parser 124 may be shared across Meta Data Management applications, such as Ab Initio Meta Data Management, to integrate the Spark lineage with the rest of the jobs running on Ab initio/Informatica to capture end to end lineages.

When SPARK code is submitted to SPARK submit 132, it may be processed by a SPARK execution flow, which may include SPARK execution 134. The output of SPARK execution flow is a decisive logical plan.

SPARK listener 136 may be registered by SPARK execution 134 and may be part of a Data Frame SQL Lineage Engine. After the SPARK job is complete, the data frame SQL lineage engine may extract the lineage using plan parser 138. Plan parser 138 provides the data lineage to job lineage builder 140.

In one embodiment, plan parser 138 may reads a debugged log created by the Spark job for any type of transformation in Java SPARK DSL, PYTHON (Data frames) or HQL. The parsing process collects the data in a readable JSON format. Build a generic code parser API's in Java and Python and store the results in a graph DB for building hierarchical and relations The output from the plan parser 138 may be shared across Meta Data Management applications, such as Ab Initio Meta Data Management, to integrate the Spark lineage with the rest of the jobs running on Ab initio/Informatica to capture end to end lineages.

Job lineage builder 140 may include one or more components or modules, such as lineage building, optimization, and consolidation module 142, job lineage, attributes input/output (I/O), and execution information module 144, and database loader 146. Job lineage builder 140 may use the output of the RDD static lineage engine and/or the SQL lineage engine and the RDD static lineage engine. The RDD static lineage engine may capture lineage for RDD code blocks by parsing SPARK code at the time of code commit and sequence the transformations according to the code flow. The SQL lineage engine may capture job lineage when the job gets executed, and is dynamic in nature.

Lineages harvested from static parser 124 and the SQL lineage engine may be merged and consolidated to form a single lineage, resulting in a job lineage, job attributes, job I/O, and job execution information. The job lineage and job attributes may be further refined to extract additional information for each attribute, transformation and job cost estimations, and attribute PI/complexity/classifier.

The optimization result produced from lineage building, optimization, and consolidation module 142 is a list or array of job lineage with execution information. Job Lineage, Attributes, Input/Output datasets, Execution Information module may split this list into job lineage, execution information, attributes and input/output datasets. From the job lineage, the total time and time taken for each transformation are collected and multiplied by a cost factor with respective cost incurred to execute the process. In one embodiment, the cost factor may be based on costs of hardware, software and additional factors that incur cost to maintain infrastructure. Attribute cost may be calculated from attribute transformations logic, based on the attribute derived logic attribute can be classification as derived/straightforward, attribute complexity (e.g., simple, medium, complex, etc.) may be flagged at the same time the attribute is flagged or classified as personal information/non-personal information based on internal audit framework. The and final results are loaded to attribute database 150 using database loader 146.

Web services 160 may provide an interface for graphical user interface 162. Data loaded in database attribute database 150 may be presented to an end user using GUI 162 and web services 160. In one embodiment, GUI 162 may provide a better user experience and for easy analysis. GUI 162 may retrieve the lineage-related metadata from attribute database 150.

Command line interface (CLI) 164 may provide similar access to an end user using a command line API.

Database interface 166 may provide an interface to attribute database 150 for power users.

Metadata repository (MDR) API 168 may integrate the lineage captured from any SPARK job with existing metadata.

Attribute traversing engine 155 may find the attribute lineage for any attribute captured in a SPARK job identified by web services 160, CLI 164, or DB interface 164. In one embodiment, an attribute traversing method may be used. When a new attribute is found in a dataset, a unique ID may be assigned and all its alias names are also stored against the same ID. Once a query is received for an attribute name, attribute ID may be fetched and, using lineage relationship engine, 158, all transformations may be fetched in which the given attribute is involved. These transformations may be represented in sequential form. This traversing may also be limited to a single job from one Input to Output. In such a case, lineage relationship engine 158 is not needed.

Lineage relationship engine 158 may analyze data in attribute database 150 to identify relationships among different SPARK jobs, such as dependencies, for any SPARK job identified by web services 160, CLI 164, or DB interface 164. In one embodiment, lineage relationship engine 158 may apply a lineage relationship method. For example, SPARK jobs read data by reading one or more Input datasets and loads to in-memory. It then applies transformations on the Input and writes data to one more Output datasets. The lineage relationship method is used to stitch jobs using a simple yet powerful corollary—the input(s) of current job is the output of previous job. Establishing hierarchical relationships for all the input and output pairs is used to determine an attribute lineage from origin to destination by navigating from one job to another job.

Figure 2:
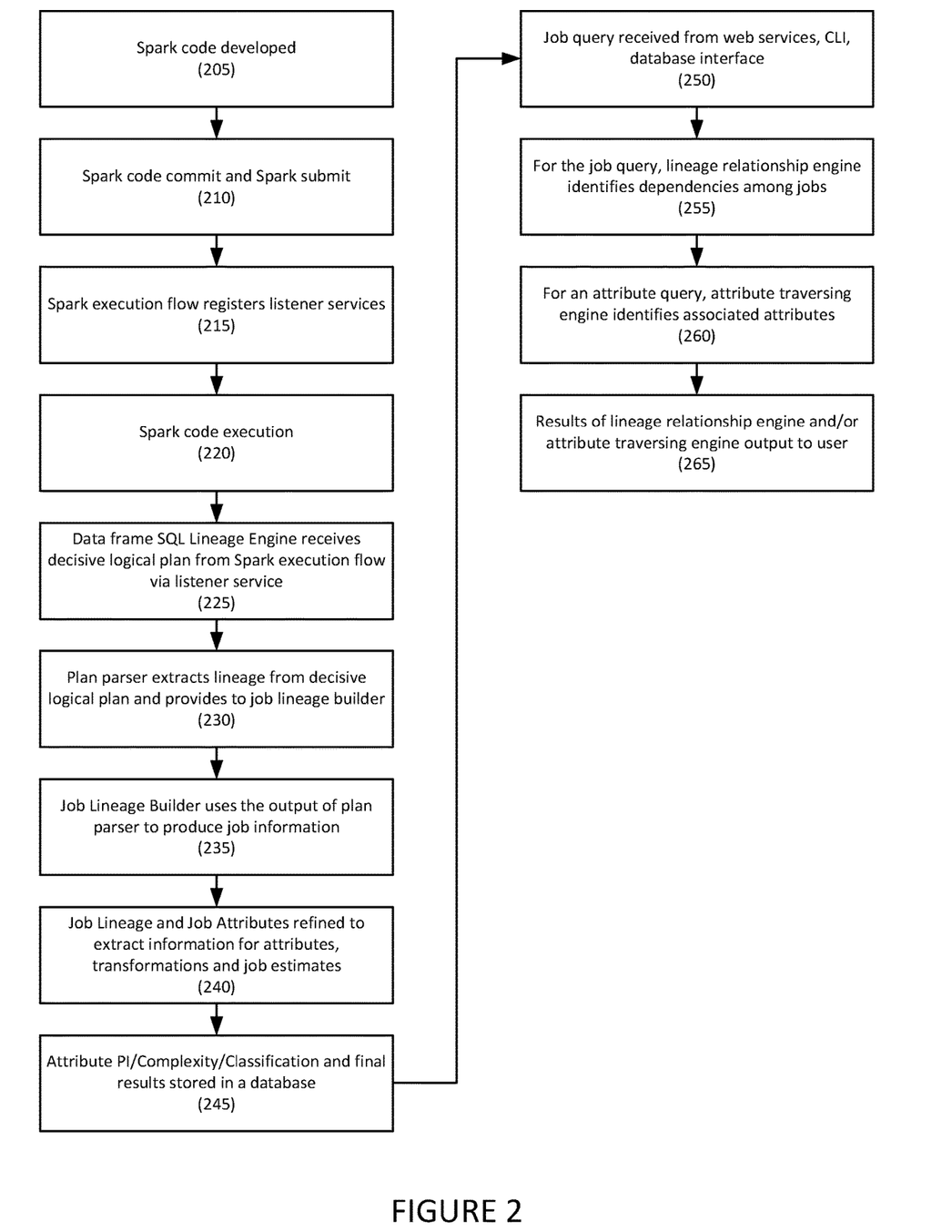
FIG. 2 depicts a method for SPARK lineage data capture according to one embodiment.

Referring to FIG. 2, a method for SPARK lineage data capture is illustrated according to one embodiment. In embodiments, a data lineage engine may capture a lineage for everything that runs in Hadoop SPARK Context, such as Scala, Java, Python, HQL, Spark SQL, etc. It may further capture statistics, such as run time and volume carried for each stage.

In step 205, SPARK code may be developed, and in step 210, SPARK code may be submitted using, for example, SPARK submit.

In step 215, a SPARK execution flow registers listener services.

In step 220, the SPARK code may be executed. For example, using a catalog, such as a set of libraries/lexical analyzer provided by SPARK, SPARK (e.g., the Query Manager) converts the parsed or indecisive logical plan to a decisive logical plan, and then a SPARK Manager, for example, optimizes the logical plan with a catalyst optimizer, resulting in an optimized plan.

Rule-based catalyst optimizations may include predicate pushdown, projecting pruning, Boolean expression simplification, etc. Cost-based optimization may then be performed by generating multiple plans using rules and computing costs of each plan.

The optimized plan may then be converted into one or more physical plans by splitting the data manipulation logic into multiple stages, such as logical units of transform/ operational work that can be performed on data. These may be referred to as Direct Acyclic Graphs, or DAGs. By leveraging DAGs, the stages may be executed in a bottom up approach, only when an output operation (saving data to external system, count etc.) is encountered. In other words, when save/count, etc. actions are found, the corresponding code will be executed.

While the job is being executed, fetch transformations may be performed on the data from the DAG used by SPARK to execute the data pipeline in a hierarchal approach. In one embodiment, a SPARK-provided query listener services may be used.

In step 225, a data frame SQL lineage engine may receive the decisive logical plan from SPARK execution flow via the listener service, and, in step 230, a plan parser may extract the lineage from the decisive logical plan. It may then provide the lineage to a job lineage builder.

In step 235, the job lineage builder may use the output of the plan parser to produce job information, including job lineage, job attributes, jobs input/output datasets, and job execution information.

In step 240, the job lineage builder may refine the job lineage and job attributes to extract information for attributes, transformations and job estimates. Examples may include attribute name, type, classification based on the data it holds, complexity based on the attribute, etc. may be derived.

In step 245, the attribute personal information, complexity, classification, and final results derived in step 240 may be stored in an attribute database.

In step 250, a job query for data lineage may be received. For example, the job query may be received from a web service, a command line interface (CLI), or a database interface. The job query may include, for example, job name, table, file, attribute name, etc.

In step 255, a lineage relationship engine may identify dependencies among jobs. For example, given any parameter in the job query, the lineage relationship engine may fetch a base job name and may perform a recursive search until both ultimate origin and ultimate destination are traversed. In one embodiment, the lineage relationship engine may apply the lineage relationship method as discussed above.

In step 260, for an attribute query, an attribute traversing engine identifies associated attributes using, for example, the attribute traversing method discussed above in step 240.

In one embodiment, the attribute query may be received as part of the job query received in step 250, above.

In step 265, the results of the lineage traversing engine and/or the attribute traversing engine may be output to the user or system.

Figure 3:
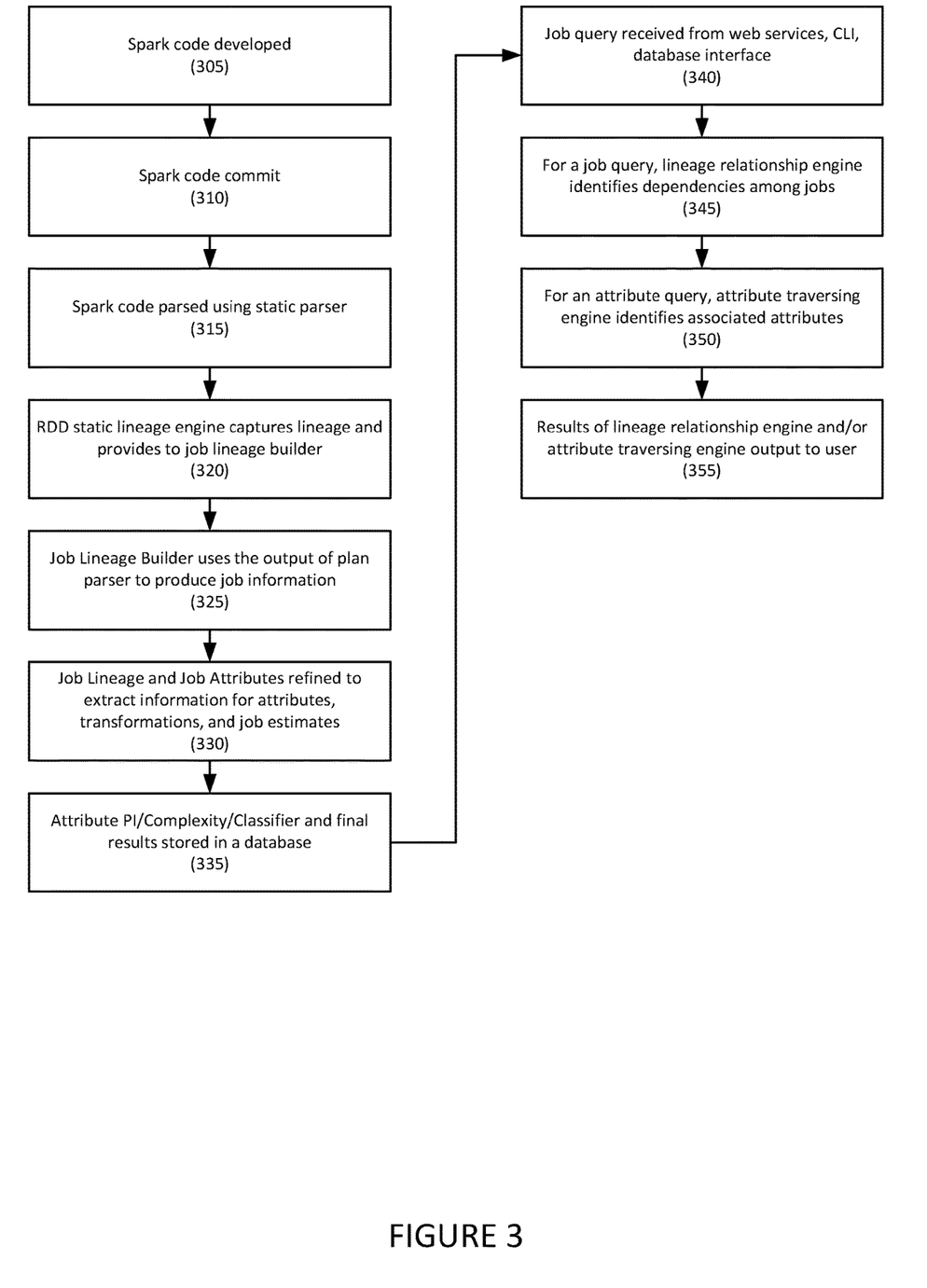
FIG. 3 depicts a method for SPARK lineage data capture according to another embodiment.

Referring to FIG. 3, a method for SPARK lineage data capture is illustrated according to one embodiment.

In step 305, SPARK code may be developed, and in step 310, SPARK code is committed.

In step 315, the SPARK code may be parsed using a static parser.

In step 320, a RDD static lineage engine may capture lineage for RDD code blocks by parsing SPARK code at the time of code commit and sequence the transformations according to the code flow. The SQL lineage engine may capture job lineage when the job gets executed. The output may be provided to a job lineage builder.

In step 325, the job lineage builder may use the output of the plan parser to produce job information, including job lineage, job attributes, jobs input/output datasets, and job execution information.

In step 330, the job lineage builder may refine the job lineage and job attributes to extract information for attributes, transformations and job estimates.

In step 335, the attribute personal information, complexity, classification, and final results may be stored in an attribute database.

In step 340, a job query for data lineage may be received. For example, the job query may be received from a web service, a command line interface (CLI), or a database interface. This may be similar to step 250, above.

In step 345, a lineage relationship engine may identify dependencies among jobs. In one embodiment, the lineage relationship engine may apply the lineage relationship method as discussed above. This may be similar to step 255, above.

In step 350, for an attribute query, an attribute traversing engine identifies associated attributes using, for example, the attribute traversing method discussed above. This may be similar to step 260, above.

In step 355, the results of the lineage traversing engine and/or the attribute traversing engine may be output to the user or system. This may be similar to step 265, above.

Embodiments may provide at least some of the following technical advantages: (1) embodiments may work with Spark-Scala, Java, Python, HQL (Independent of Tools, Languages running on Spark); (2) embodiments may support from Spark version 2.2 and above; (3) embodiments may provide lineage for Java RDDs; (4) embodiments may "plug and play" without additional code; (5) embodiments may provide attribute level data lineage; (6) embodiments may be integrated any spark framework like UDS, PIF, Merlin pipelines; (7) embodiments may stitch the linkage between different job by identifying the inputs/outputs; (8) embodiments may provide and/or use graph databases for user interactive queries; (9) embodiments may be integrated with Ab Initio MDR, Collibra, and Atlas; (10) embodiments may capture user semantic user consumption pattern; (11) embodiments may help in projecting impact analysis and effort estimations for a change request; (12) embodiments may classify the attribute as simple, medium, complex based on logic; (13) embodiments may support version control; (14) embodiments may use APIs to support lineage for data transfer within a network like SFTP; (15) embodiments may support lineage versions; (16) embodiments may track data movements volumes between jobs starting from ingestion to semantic; (17) embodiments may provide exceptions history, wherein, for each job, embodiments may track and save every production exception that occurred, as well as the fix applied; (18) embodiments may provide rule-based monitoring of systems that may halt further jobs from triggering if a rule is violated (e.g., do not proceed to ingest data to development environment if PII columns are nullified); (19) embodiments may provide rule-based archival systems that may analyze lineage graphs and capture data that is active and inactive. Based on default configurations and the active/inactive segments of data, this may trigger archival of data.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for lineage data capture, comprising:
receiving, at a lineage engine and from a listener service, a parsed or indecisive logical plan for a job;
converting, by a query manager, the parsed or indecisive logical plan to a decisive logical plan;
extracting, using a plan parser, lineage data from the decisive logical plan;
receiving, from a metadata repository, existing metadata associated with the job;
integrating the existing metadata into the extracted lineage data to generate supplemented lineage data;
producing, by a job lineage builder, job lineage data and job attribute data from the supplemented lineage data;
extracting, by the job lineage builder and from the job lineage data and the job attribute data, attribute information, transformation information, and estimate information for the job;
storing, in a database, the attribute information, the transformation information, and the estimate information;
determining, based on the attribute information and using an attribute traversing engine, at least one other job associated with the job;
stitching the at least one other job to the job; and
presenting the stitched at least one other job, the attribute information, the transformation information, and the estimate information on a graphical user interface (GUI).

2. The method of claim 1, further comprising:
receiving, at the GUI, a job query for data lineage for the job;
identifying, by a lineage relationship engine, a base job for the job and identifying at least one dependency for the base job;
executing, by the lineage relationship engine, a recursive search on the database until an origin and a destination for the base job are identified; and
outputting, at the GUI, the origin and the destination for the base job.

3. The method of claim 2, wherein the GUI comprises a web service, a command line interface, or a database interface.

4. The method of claim 1, wherein the associated attributes comprise one or more of an attribute name, an attribute type, an attribute classification, and an attribute complexity.

5. The method of claim 1, wherein the decisive logical plan comprises a plurality of stages.

6. The method of claim 5, wherein each stage comprises a direct acyclic graph.

7. A system for lineage data capture, comprising:
a job lineage builder executed by a computer processor;
a graphical user interface (GUI);
a lineage engine executed by a computer processor and comprising a plan parser; and
an attribute database;
wherein:
the lineage engine is configured to receive a decisive logical plan for a job and from a listener service, the decisive logical plan converted from a parsed or indecisive plan by a query manager;
the plan parser is configured to extract lineage data from the decisive logical plan, to receive existing metadata associated with the job from a metadata repository, and to integrate the existing metadata into the extracted lineage data to generate supplemented lineage data;
the job lineage builder is configured to produce job lineage data and job attribute data from the supplemented lineage data;
the job lineage builder is configured to extract attribute information, transformation information, and estimate information for the job from the job lineage data and the job attribute data;
the job lineage builder is configured to store the attribute information, the transformation information, and the estimate information in the attribute database
the job lineage builder is configured to determine, based on the attribute information and using an attribute traversing engine, at least one other job associated with the job;
the job lineage builder is configured to stitch the at least one other job to the job; and
the job lineage builder is configured to present the stitched at least one other job, the attribute information, the transformation information, and the estimate information on the GUI.

8. The system of claim 7, further comprising:
a lineage relationship engine;
wherein:
the GUI is configured to receive a job query for data lineage for the job;
the lineage relationship engine is configured to identify a base job for the job and at least one dependency for the base job;
the lineage relationship engine is configured to execute a recursive search on the attribute database until an origin and a destination for the base job are identified; and
the GUI is configured to output the origin and the destination for the base job.

9. The system of claim 8, wherein the GUI comprises a web service, a command line interface, or a database interface.

10. The system of claim 7, wherein the associated attributes comprise one or more of an attribute name, an attribute type, an attribute classification, and an attribute complexity.

11. The system of claim 7, wherein the decisive logical plan comprises a plurality of stages.

12. The system of claim 11, wherein each stage comprises a direct acyclic graph.

13. A non-transitory computer readable medium having stored thereon software instructions that, when executed by a processor, cause the processor to perform the following:
receive a parsed or indecisive logical plan for a job and from a listener service;
convert, by a query manager, the parsed or indecisive logical plan to a decisive logical plan;
extract lineage data from the decisive logical plan;
receive existing metadata associated with the job from a metadata repository;

integrate the existing metadata into the extracted lineage data to generate supplemented lineage data;

produce job lineage data and job attribute data from the supplemented lineage data;

extract attribute information, transformation information, and estimate information for the job from the job lineage data and the job attribute data;

store the attribute information, the transformation information, and the estimate information in an attribute database;

determining, based on the attribute information and using an attribute traversing engine, at least one other job associated with the job;

stitching the at least one other job to the job; and presenting the stitched at least one other job, the attribute information, the transformation information, and the estimate information on a graphical user interface (GUI).

14. The non-transitory computer readable medium of claim 13, further comprising software instructions that, when executed by a processor, cause the processor to:

receive a job query for data lineage for the job from the GUI;

identify a base job for the job and at least one dependency for the base job;

execute a recursive search on the attribute database until an origin and a destination for the base job are identified; and output the origin and the destination for the base job to the GUI.

15. The non-transitory computer readable medium of claim 14, wherein the GUI comprises a web service, a command line interface, or a database interface.

16. The non-transitory computer readable medium of claim 14, further comprising software instructions that, when executed by a processor, cause the processor to output the attributes for the base job.

* * * * *